United States Patent
Yamane et al.

(10) Patent No.: US 7,500,404 B2
(45) Date of Patent: Mar. 10, 2009

(54) MASS FLOW METER

(75) Inventors: Takashi Yamane, Ibaraki (JP); Ryo Kosaka, Ibaraki (JP)

(73) Assignee: National Institute of Advanced Industrial Science & Technology, Tokyo (JP)

( * ) Notice: Subject to any disclaimer, the term of this patent is extended or adjusted under 35 U.S.C. 154(b) by 37 days.

(21) Appl. No.: 11/707,050

(22) Filed: Feb. 16, 2007

(65) Prior Publication Data

US 2007/0193371 A1 Aug. 23, 2007

(30) Foreign Application Priority Data

Feb. 17, 2006 (JP) ............... P.2006-040675

(51) Int. Cl.
*G01F 1/84* (2006.01)

(52) U.S. Cl. .................. 73/861.355

(58) Field of Classification Search ............ 73/861.355, 73/861.356, 861.357, 861.351; 600/17; 623/3.28; 702/45
See application file for complete search history.

(56) References Cited

U.S. PATENT DOCUMENTS 3,927,565 A * 12/1975 Pavlin et al. ............ 73/861.355
6,443,983 B1 * 9/2002 Nagyszalanczy et al. ... 623/3.28

FOREIGN PATENT DOCUMENTS

JP 9-79881 3/1997
JP 10-33664 2/1998

* cited by examiner

*Primary Examiner*—Jewel Thompson
(74) *Attorney, Agent, or Firm*—Morgan, Lewis & Bockius LLP

(57) ABSTRACT

Strain gauges A, B for a bending portion cross each other and are stuck to a strain gauge sticking portion 7 for a bending portion located in a portion applying centrifugal force or centripetal force of a fluid thereto in a bending portion 4 in a bending circular tube 1 formed by bending a tube circulating the fluid therein. Further, strain gauges C, D for compensating static pressure and temperature cross each other and are stuck to a strain gauge sticking portion 11 for a straight tube portion located in a straight tube portion 8 connected to the bending portion 4 in the bending circular tube 1. Detecting signals of strain gauges A, B for a bending portion and strain gauges C, D for compensation are guided to an opposite position of a bridge circuit 12.

15 Claims, 6 Drawing Sheets

A: CENTRIFUGAL FORCE DETECTING GAUGE 1
B: CENTRIFUGAL FORCE DETECTING GAUGE 2
C: STATIC PRESSURE AND TEMPERATURE COMPENSATING GAUGE1
D: STATIC PRESSURE AND TEMPERATURE COMPENSATING GAUGE2
E: HARD TUBE
F: FLUID

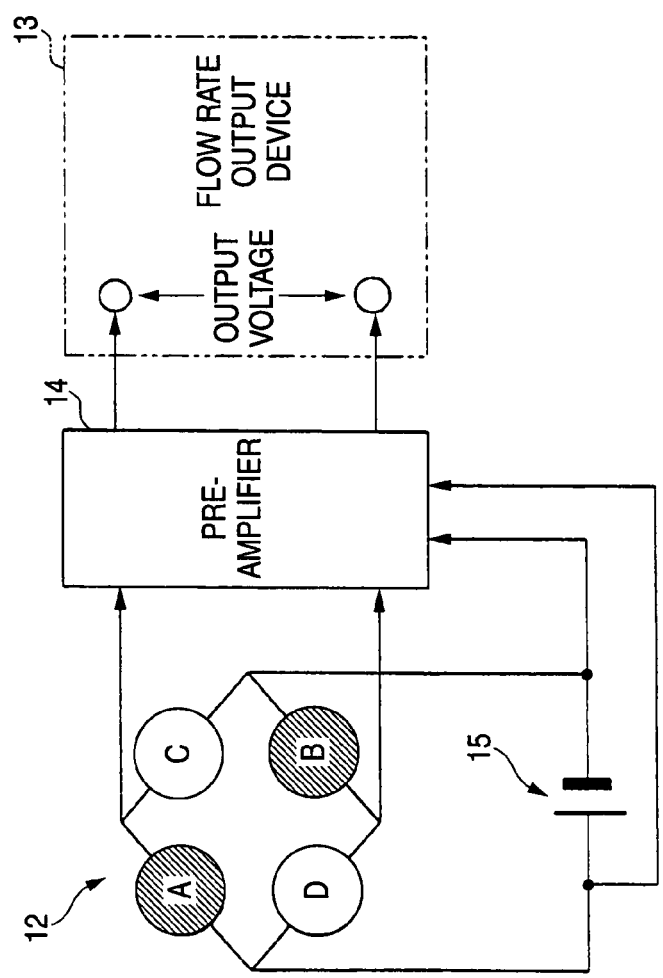

MASS FLOW METER

BACKGROUND OF THE INVENTION

This invention relates to a mass flow meter relates to a mass flow meter used in a device requiring a light flow meter of a gram order, and particularly relates to a mass flow meter suitable for the measurement of a mass flow rate of an artificial heart for an operation, a bedside type artificial heart, or an implantable artificial heart.

The measurement of the flow rate is indispensable in various kinds of technical fields, and many flow meters are conventionally proposed. In these flow meters, the mass flow meter can measure the flow rate converted in a standard state irrespective of using temperature and pressure of a measured fluid. Therefore, the mass flow meter is indispensable as a flow meter able to make a precise measurement. In such a mass flow meter, for example, a thermal type flow meter and a Coriolis type flow meter exist. However, in the thermal type flow meter, it is necessary to heat the fluid. Therefore, the thermal type flow meter is suitable for gas notable in a temperature rise, but is not suitable for a liquid of high density. Accordingly, the thermal type flow meter can be applied to only a liquid of a very small flow rate. Further, no fluid unable to be heated can be measured in the thermal type flow meter. Accordingly, it is particularly difficult to apply the thermal type flow meter to a liquid such as blood having high viscosity and unable to be heated. Further, in the Coriolis flow meter, problems exist in that a vibration mechanism device of a U-character tube is required, and is large-sized and price is high, and pressure loss is inevitable from the features of a shape, and it is difficult to clean the device when a U-character tube portion is blocked, etc. Accordingly, no Coriolis flow meter is suitable for the flow rate measurement of the fluid in which a component is changed by vibration.

On the other hand, in Japan, the organ transplant law is enforced, and heart transplantation from a person of brain death can be performed. However, donors are insufficient in the real situation. Therefore, a way for rescuing a left patient is only the artificial heart. The artificial heart is researched for a long time, and many clinical applications are reported. In the artificial heart, there are a ventricular assist device for inserting a natural heart in parallel without cutting the natural heart, and a total replacement artificial heart for cutting and connecting the natural heart. Conventionally, these artificial hearts are almost of an air driving type for arranging a controller in a bed site. However, in recent years, a ventricular assist device for an abdominal implantation, and electrically operated by using a battery attached to a belt or a rucksack is also developed. In present products, the artificial heart able to be remedied at home is used although it is limited to the artificial heart for a patient of a large physical constitution from a point of its size. In addition, a blood pump for an operation is comparatively used for a long period, and a similar mechanism is also used for circulatory assist device. Here, these are generally called the artificial heart.

When such an artificial heart is classified from the point of a pump type, two systems constructed by a pulsatile flow system and a continuous flow system generally exist. The pulsatile flow type is a system for sending-out the blood of a constant amount every one pulsatile output, and has the actual using results of a year unit in the ventricular assist device advanced in clinical application. The continuous flow type is a system for sending-out the blood at a constant pressure by a rotating mechanism. In this system, a sending-out amount is not directly relative to pump volume, and the system is easily made compact, and is promising for the implantable ventricular assist device. In reality, the natural heart is left, and for example, a ventricular assist device 32 is connected by a blood tube 33 with respect to the left atrium or the left ventricle of the natural heart 31 as shown in FIG. 3. A pulsatile flow is physiologically preferable. However, with respect to an influence of a non-pulsatile flow at a heart stop even in the worst case, it is reported that any physiological problems do not occur in some animal experiments.

The development of the continuous flow type artificial heart is advanced in Japan, and there are individual types such as a centrifugal type, an axial flow type, a rotating volume type, etc. in a continuous Flow type pump. In each type, pump characteristics can be characterized in the relation of pressure, the flow rate, electric power and a rotational speed, and it is necessary to measure the flow rate of the pump and control a driving rotational speed. A centrifugal artificial heart as shown in FIG. 4A is invented by the present inventors as a concrete example of such a pump, and is patented as Japanese patent No. 2807786 (JP-A-10-33664). In accordance with this artificial heart, as shown in FIG. 4, a centrifugal type impeller 42 is supported by two bearings 46-48 and 45-50. An impeller drive unit 51 is arranged in the lower portion of a casing 47. A magnet group 44 built in the impeller is rotated and operated through a partition wall 49 by rotating a magnet 53 within this impeller drive unit 51. Thus, blood is flowed-in from an inlet 54 formed in a casing upper portion, and can be discharged from an outlet 43 arranged around the lower portion of the casing. A structure adopting a drive unit of a direct drive system formed by replacing a movable portion 53 with an electromagnet group is also developed as a means for rotating the impeller by the above magnetic coupling.

Further, the present inventors, etc. have developed a pump as shown in FIG. 4B in addition to the above centrifugal artificial heart. In the pump shown in this figure, in an impeller section 62 having plural impellers 61 extending in a radial shape, its central portion is released and forms an inflow portion 63 of blood. When the impeller 61 is rotated and operated, the blood is sucked from a cylindrical flow inlet 65 arranged in an upper side casing 64, and is discharged from an outlet 66 arranged in the upper side casing 64. An impeller support member 67 is fixed to a lower portion of the impeller section 62, and a bearing member 68 is fixed to the inside of the impeller support member 67. A hydrodynamic bearing groove 71 for Lower side thrust having a spiral shape pattern of a pump-in type is formed on a lower end face 70 of the bearing member 68. A hydrodynamic bearing groove 73 for upper side thrust having a spiral shape pattern of a pump-out type is formed on an upper end face 72. A fixing shaft 77 fixed onto a lower side thrust receiving portion 76 fixed to a lower side casing 75 is projected and fixed to a cylindrical passage port portion 74 formed at the center of the bearing member 68. An upper side thrust receiving portion 78 is fixed and supported by a fixing member 79 in an upper end portion of the fixing shaft 77. The above lower side thrust receiving portion 76 is arranged so as to be opposed to the hydrodynamic bearing groove 71 for lower side thrust, and the above upper side thrust receiving portion 78 is arranged so as to be opposed to the hydrodynamic bearing groove 73 for upper side thrust. Further, a spiral groove 80 for generating pressure is formed in a lower outer circumference of the fixing shaft 77. Permanent magnets 81 are arranged at an equal interval in the outer circumference of the impeller support member 67. An electromagnet 82 is arranged in the outer circumference of the lower side casing 75 so as to be opposed to the above permanent magnet 81. A motor of a direct drive system is constructed by sequentially changing the polarity of this electromagnet 82 and conducting an electric current, and is set to an impeller drive unit 83.

With respect to the centrifugal artificial heart, patent literature 1 proposed by the present inventors, etc. exists as mentioned above. Further, density measuring portions are respectively arranged inside and outside a bending pipe. A density difference caused by centrifugal force of a liquid on the inside and the outside of the bending pipe is measured by these density measuring portions. The volume flow rate is then calculated by an arithmetic device on the basis of this density difference. Such a technique is disclosed in patent literature 2.

[Patent literature 1] JP-A-10-33664

[Patent literature 2] JP-A-9-79881

SUMMARY OF THE INVENTION

In the above artificial heart, control of the rotational speed of the impeller results in control of the blood flow rate circulated within the body, and is therefore very important with respect to the human body. Accordingly, it is necessary to always monitor the blood flow rate caused by rotating the impeller, and supply the blood of an accurate flow rate according to a state of the human body.

In the flow rate measurement of the artificial heart, a blood flow rate can be estimated from a pulse rate in the pulsatile pump, and can be also estimated from an electric current and the rotational speed in the centrifugal pump. Further, in the axial flow pump, the blood flow rate can be estimated by making an arithmetic calculation from inlet and outlet pressures and the rotational speed. However, there is no sensor able to directly measure the mass flow rate at present. Since, various compensations, such as for an influence of viscosity, etc., are required for estimation, the arithmetic calculation becomes complicated so that reliability is violated.

Further, in the above implantable artificial heart used outside a hospital as shown in FIG. 3, flow rate display is required to manage a clinical condition, but there is no compact implantable flow meter. There are various systems such as an eddy flow meter, a resistance flow meter, a float type flow meter, etc. as the flow meter. However, a problem exists in that there is no simple system very light in weight and able to make the measurement in a gram order. Further, it is also necessary to use a flow meter having a smooth surfaces and generating no stagnation causing thrombus formation.

Thus, if the flow meter very light in weight and having a simple structure exists, it is also very useful in various kinds of flow meters of various fields conventionally used.

Accordingly, a main object of the present invention is to obtain a flow meter very light in weight and with smooth surface and in a simple structure. In particular, an object of the present invention is to obtain a mass flow meter for artificial hearts, further, especially for implantable artificial hearts.

To solve the above problems, there is provided a mass flow meter including:

a tube path circulating a fluid therein, and a strain gauge for detecting centrifugal force or centripetal force stuck to a portion applying the centrifugal force or the centripetal force of the fluid thereto within the tube path, wherein a flow rate is measured by the output of a bridge circuit for guiding a detecting signal of the strain gauge.

As another mass flow meter in the present invention, there is provided the above mass flow meter, wherein the portion applying the centrifugal force or the centripetal force of the fluid thereto within the tube path circulating the fluid therein is a bending portion or a vicinity thereof in a bending tube formed by bending the tube circulating the fluid therein.

As another mass flow meter in the present invention, there is provided the above mass flow meter, wherein the strain gauge for compensation compensates static pressure or temperature.

As another mass flow meter in the present invention, there is provided the above mass flow meter, further including:

a strain gauge for compensating static pressure or temperature stuck to a place different from the portion applying the centrifugal force or the centripetal force thereto, wherein detecting signals of the strain gauge for detecting the centrifugal force or the centripetal force and the strain gauge for compensation are guided to an opposite position of the bridge circuit, and an output already compensated is used.

As another mass flow meter in the present invention, there is provided the above mass flow meter, further including:

a strain gauge for compensation stuck to a place different from the portion applying the centrifugal force or the centripetal force thereto, wherein detecting signals of the strain gauge for detecting the centrifugal force or the centripetal force and the strain gauge for compensation are guided to separate bridge circuits, and the flow rate is measured by comparing and arithmetically calculating an output of the strain gauge for detecting the centrifugal force or the centripetal force and an output of the strain gauge for compensation.

As another mass flow meter in the present invention, there is provided the above mass flow meter, wherein the strain gauge for compensation is arranged in a straight tube portion connected to a bending portion in the bending tube.

As another mass flow meter in the present invention, there is provided the above mass flow meter, wherein the strain gauge for compensation is stuck in a position perpendicular to an outer circumferential portion applying the centrifugal force of the fluid of the bent tube portion thereto in the straight tube portion with a tube axis as a center.

As another mass flow meter in the present invention, there is provided the above mass flow meter, wherein the tube path of the strain gauge sticking portion is formed to have a thin wall.

As another mass flow meter in the present invention, there is provided the above mass flow meter, wherein the strain gauge is stuck in two perpendicular directions to improve signal intensity.

As another mass flow meter in the present invention, there is provided the above mass flow meter, wherein the mass flow meter is used in the flow rate measurement of an artificial heart.

Further, as another mass flow meter in the present invention, there is provided the above mass flow meter, wherein the mass flow meter is used in the flow rate measurement of the implantable artificial heart.

In the mass flow meter of the present invention, no member except for four strain gauges, a preamplifier, and a structure utilizing a control electric power source of an existing pump is required in this device. Further, the mass flow rate is directly measured. Accordingly, no fluid correction except for a temperature correction is required at all, and a mass flow meter very light in weight can be constructed. Further, since there is no obstacle within the flow path of a measured fluid, there is no fear of thrombus formation. Further, the mass flow meter can be compactly formed. Accordingly, the mass flow meter can be also effectively utilized in the implantable artificial heart.

BRIEF DESCRIPTION OF THE DRAWINGS

FIG. 1B is a circuit constructional view of this mass flow meter.

DETAILED DESCRIPTION OF THE PREFERRED EMBODIMENTS

The present invention can obtain a flow meter very light in weight and with smooth surface and in a simple structure. In particular, the object of obtaining a mass flow meter for an artificial heart is realized by sticking a strain gauge for detecting centrifugal force or centripetal force to a portion applying the centrifugal force or the centripetal force of the fluid thereto within a tube path circulating the fluid therein, and measuring a flow rate by the output of a bridge circuit for guiding a detecting signal of the strain gauge.

Embodiment 1

Figure 1A:
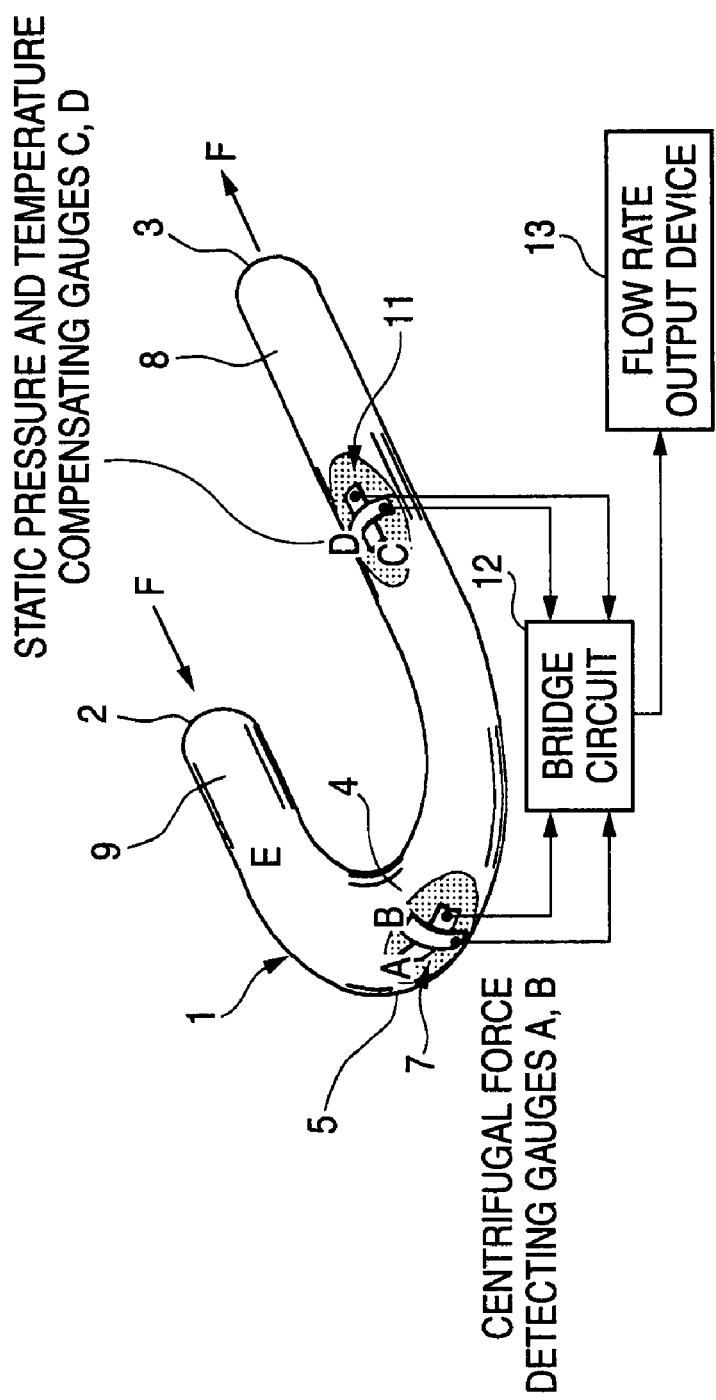
FIG. 1A is a system constructional view of a mass flow meter in the present invention.

FIG. 1A schematically shows an entire mass flow meter in the present invention. A hollow bending circular tube 1 bent in a U-character shape in this figure has an inlet 2 and an outlet 3 of a fluid, and the fluid can be circulated within the bending circular tube 1. Strain gauges A, B as a centrifugal detecting gauge arranged in a cross shape in this figure are stuck to an outer circumferential portion 5 receiving centrifugal force due to the internal fluid in a bending portion 4 of this bending circular tube 1. In the illustrated embodiment, strain gauge A is stuck in parallel with a tube axis of the bending circular tube 1, and strain gauge B is stuck perpendicularly to strain gauge A. The embodiment of the present invention explained later shows an example in which the strain gauge for detecting the centrifugal force is stuck to an application portion of the centrifugal force of the bending circular tube. However, a similar function can be also obtained when the strain gauge for detecting centripetal force is stuck to an inside portion to which the centripetal force of the bending circular tube is applied. In the above centrifugal force detecting gauge, static pressure of the fluid is also detected in addition to the centrifugal force of the fluid. Further, when the present invention is executed, it is not limited to the illustrated embodiment, but, for example, only one of strain gauges A and B may be also used.

In the bending circular tube 1, a hard tube causing no large elastic deformation by fluid pressure may be used. A strain gauge sticking portion 7 for the bending portion for sticking the strain gauge in the bending portion 4 may be set to a thin wall portion by performing suitable grinding, etc. in accordance with necessity, and may be also easily deformed by the centrifugal force provided when a fluidizing direction within the bending circular tube 1 is changed in the bending portion 4.

Further, similar to the above case, strain gauges C, D as static pressure and temperature compensating gauges are arranged in a cross shape within one of straight tube portions 8, 9 located before and after the bending portion 4 in the bending circular tube 1. In the illustrated embodiment, strain gauge C is stuck to an illustrated upper portion of the straight tube portion 8 in parallel with the axis of the bending circular tube 1, and strain gauge D is stuck perpendicularly to this strain gauge C. Thus, a strain gauge sticking portion 11 for the straight tube portion is arranged in a direction perpendicular to the strain gauge sticking portion 7 for bending for detecting the centrifugal force in the bending portion 4. Similar to the above case, for example, only one of strain gauges C and D may be also used in this strain gauge sticking portion 11 for the straight tube portion.

Further, in this portion, similar to the above case, the strain gauge sticking portion 11 for the straight tube portion for sticking the strain gauge may be also set to a thin wall portion by performing suitable grinding, etc. in accordance with necessity, and may be also easily deformed to detect the static pressure of the fluid within the straight tube portion 8 in the bending circular tube 1. This strain gauge sticking portion 11 for the straight tube portion is preferably a portion to which no centrifugal force of the fluid flowed within the bending circular tube 1 is easily applied to detect the static pressure as mentioned above. In the illustrated embodiment, this point is considered, and the strain gauge sticking portion 11 for the straight tube portion is arranged in an illustrated upper side portion of the straight tube portion 8, i.e., in a position perpendicular to an outer circumferential portion applying the centrifugal force of the fluid of a bent tube portion thereto with the tube axis as a center.

When the strain gauge is stuck to the bending circular tube 1 as in the embodiment shown in FIG. 1A, a resistance value as a detecting signal of each strain gauge is inputted to a bridge circuit 12. A signal of this bridge circuit is inputted to a flow rate output device 13, and the flow rate is arithmetically calculated. In this bridge circuit, as shown in FIG. 1B, strain gauge A and strain gauge B as a centrifugal force detecting gauge are arranged on an opposite face side, and other strain gauge C and strain gauge D are arranged on the other opposite face side.

Similar to the conventional bridge circuit, the signal of this bridge circuit is amplified by a preamplifier 14, and a voltage balance signal of the bridge circuit is processed in the flow rate output device 13, and the flow rate is arithmetically calculated. At this time, with respect to the signal of strain gauge A detecting total pressure of the centrifugal force of the fluid and the static pressure, the detecting value of strain gauge A is compensated by strain gauge C detecting pressure relative to the static pressure and temperature of the fluid. Further, with respect to the signal detected by strain gauge B, the compensation is also similarly performed by strain gauge D.

For example, when the strain gauge is stuck to each strain gauge sticking portion one by one as in strain gauge A and strain gauge C, a predetermined fixing resistor is arranged in portions of B and D in the bridge circuit 12 of FIG. 1B. In this measuring device, an electric power source 15 can be provided by the artificial heart itself.

In the above description, the mass flow meter is constructed as one bridge circuit. However, if the mass flow meter is light in weight, the mass flow meter can be also constructed by adding a comparison arithmetic circuit in which detecting signals of the strain gauge for detecting the centrifugal force or the centripetal force and the strain gauge for compensation are guided to separate bridge circuits, and an output of the strain gauge for detecting the centrifugal force or the centripetal force and an output of the strain gauge for compensation are compared and arithmetically calculated.

Figure 2:
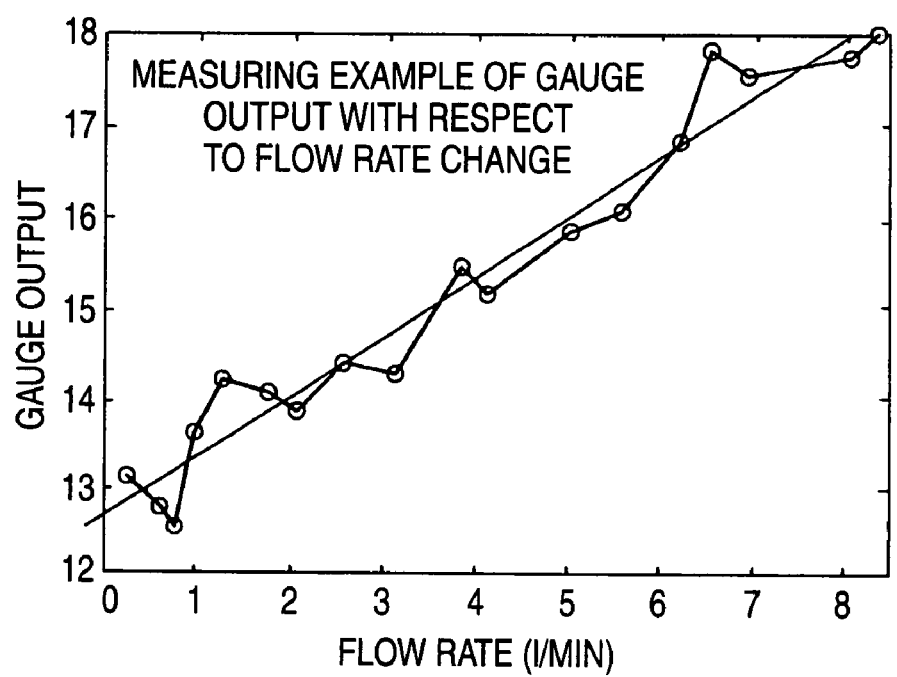
FIG. 2 is a graph showing a measuring example of the mass flow meter in the present invention.

FIG. 2 shows a result in which the flow rate is really measured by using the above mass flow meter. In this figure, a round mark shows a measured value, and a graph of a measuring example provided by connecting measured values is shown. It is understood by this graph that the mass flow meter has characteristics in which the gauge output signal and the flow rate of the fluid within the bending tube are approximately represented by a straight line. Further, it is known by such characteristics that this mass flow meter is an accurate mass flow meter of a gram order. Accordingly, the mass flow meter constructed by the system as shown in FIG. 1A and having the above characteristics can be effectively utilized in various kinds of fields.

Figure 3:
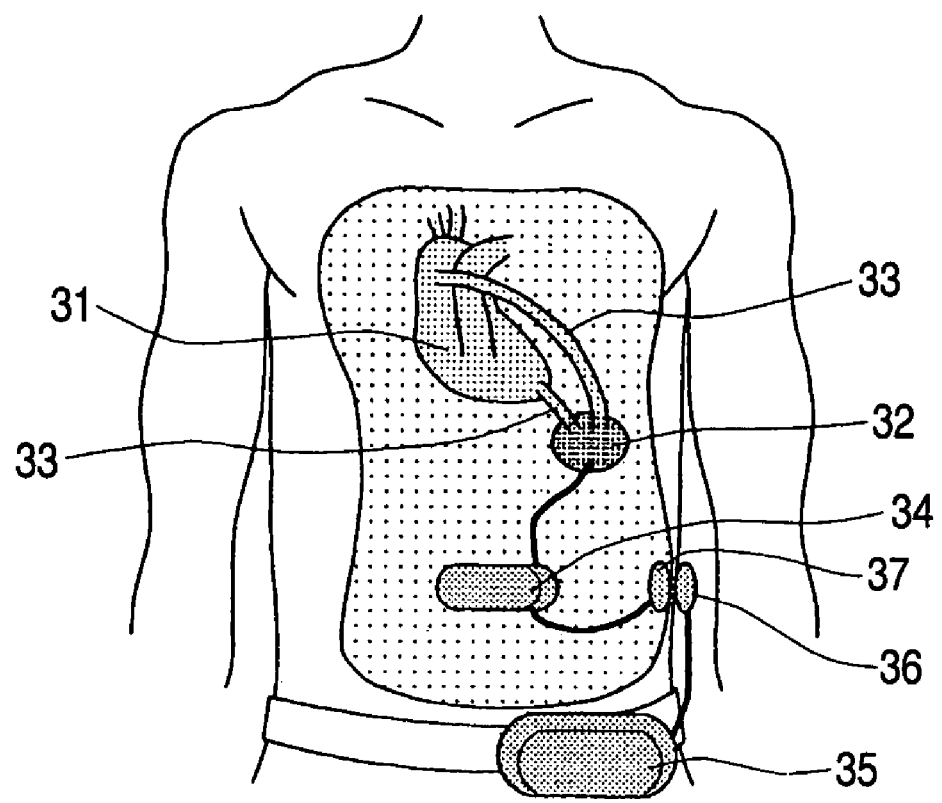
FIG. 3 is a view showing an example of implantable ventricular assist device.
Figure 4A:
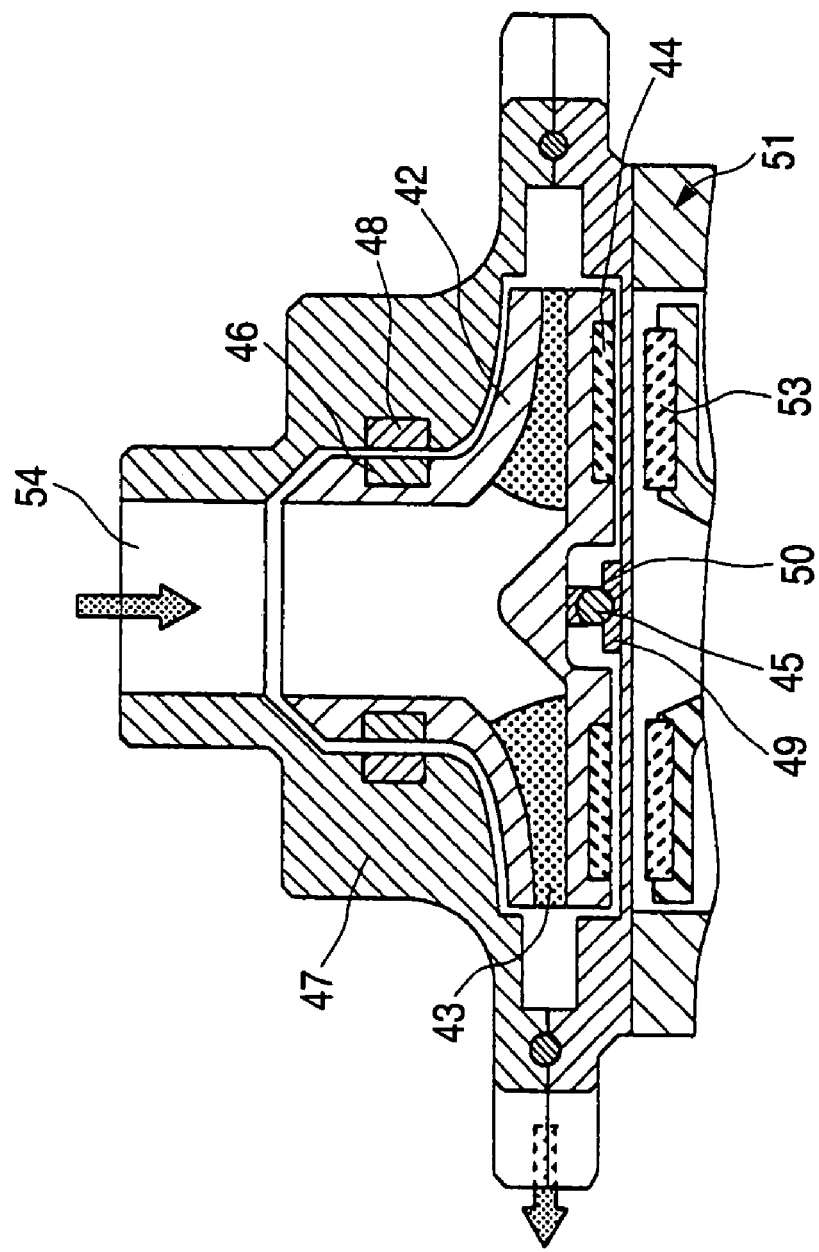
FIGS. 4A and 4B are cross-sectional views showing an example of the artificial heart proposed by the present inventors, etc.
Figure 4B:
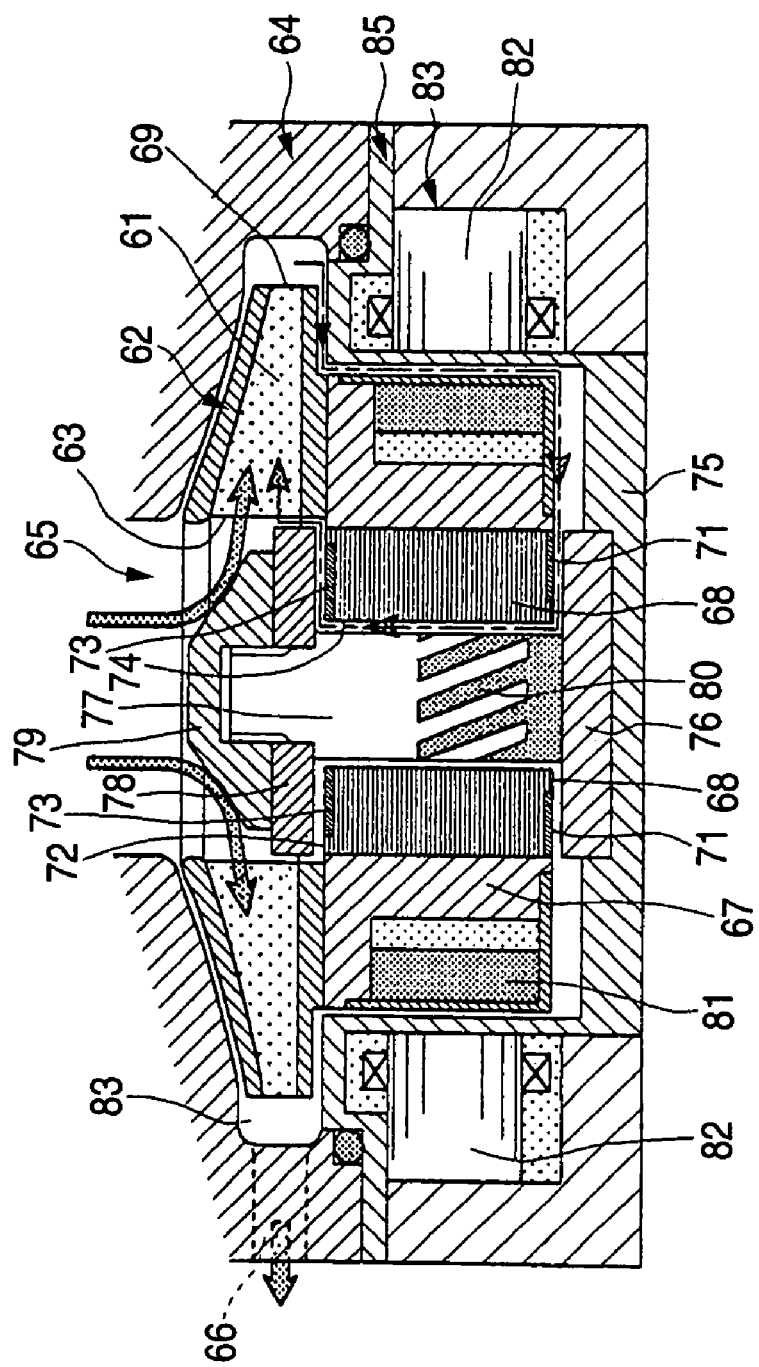

A mass flow rate measuring technique provided by measuring the centrifugal force of the fluid within the bending circular tube 1 using the above strain gauge can be particularly widely used as a mass flow rate measuring device of a liquid. Since, there is no obstacle within a fluid flow path in the flow rate measurement of an artificial heart for measuring the flow rate of blood, there is no fear of thrombus formation. Further, since the mass flow meter can be compactly formed, this technique is effective. In particular, as shown in FIG. 3, in the implantable artificial heart, it is required that the mass flow meter is compact and is simple in structure, and generates no thrombus. Therefore, the mass flow meter in the present invention is very effective in such a field.

In the system of the implantable artificial heart considered in execution in the future as shown in FIG. 3, a suitable bending circular tube portion is connected to one portion of a blood tube 33 connecting a natural heart 31 and a centrifugal blood flow pump 32. A strain gauge of a construction similar to that of the above case is stuck to this bending circular tube portion, and is suitably covered. The flow rate is arithmetically calculated using a signal of the strain gauge as mentioned above by a flow rate output device arranged within an implantable control system 34. The flow rate of the centrifugal blood flow pump 32 is controlled by this arithmetic result. In this figure, with respect to the control system 34, electric power is electromagnetically supplied from an electric power source 35 attached to the exterior of a human body to a body exterior electric power supplying portion 36 and a body interior electric power supplying section 37 opposed in proximity to this body exterior electric power supplying portion 36. This electric power is set to driving electric power of the centrifugal blood flow pump 32, and is used as electric power of the mass flow meter in accordance with necessity.

As mentioned above, the present invention is particularly effective as the mass flow meter for making the flow rate measurement required in control of the artificial heart. However, in addition, the present invention can be also effectively utilized in various kinds of mass flow meters for industry, an experiment, etc.

What is claimed is:

1. A mass flow meter comprising:
a tube path circulating a fluid therein, and
a strain gauge for detecting centrifugal force or centripetal force affixed to a portion applying the centrifugal force or the centripetal force of the fluid thereto within the tube path, wherein
a flow rate is measured by the output of a bridge circuit for guiding a detecting signal of the strain gauge.

2. The mass flow meter according to claim 1, wherein the portion applying the centrifugal force or the centripetal force of the fluid thereto within the tube path circulating the fluid therein is a bending portion or is in a vicinity of a bending tube formed by bending the tube path circulating the fluid therein.

3. The mass flow meter according to claim 1, wherein a strain gauge for compensation compensates static pressure or temperature.

4. The mass flow meter according to claim 3, further comprising:
the strain gauge for compensating static pressure or temperature is affixed to a place different from the portion applying the centrifugal force or the centripetal force thereto, wherein
detecting signals of the strain gauge for detecting the centrifugal force or the centripetal force and the strain gauge for compensation are guided to an opposite position of the bridge circuit, and
an output already compensated is used.

5. The mass flow meter according to claim 3, further comprising:
the strain gauge for compensation is affixed to a place different from the portion applying the centrifugal force or the centripetal force thereto, wherein
detecting signals of the strain gauge for detecting the centrifugal force or the centripetal force and the strain gauge for compensation are guided to separate bridge circuits, and
the flow rate is measured by comparing and arithmetically calculating an output of the strain gauge for detecting the centrifugal force or the centripetal force and an output of the strain gauge for compensation.

6. The mass flow meter according to claim 4, wherein the strain gauge for compensation is arranged in a straight tube portion connected to a bending portion in a bending tube.

7. The mass flow meter according to claim 6, wherein the strain gauge for compensation is affixed in a position perpendicular to an outer circumferential portion applying the centrifugal force of the fluid of the bending portion thereto in the straight tube portion with a tube axis as a center.

8. The mass flow meter according to claim 1, wherein the tube path disposed at the strain gauge is formed to have a thin wall.

9. The mass flow meter according to claim 1, wherein the strain gauge is affixed in two perpendicular directions to improve signal intensity.

10. The mass flow meter according to claim 1, wherein the mass flow meter is used in a flow rate measurement of an artificial heart.

11. The mass flow meter according to claim 10, wherein the mass flow meter is used in the flow rate measurement of an implantable artificial heart.

12. The mass flow meter according to claim 5, wherein the strain gauge for compensation is arranged in a straight tube portion connected to a bending portion in a bending tube.

13. The mass flow meter according to claim 12, wherein the strain gauge for compensation is affixed in a position perpendicular to an outer circumferential portion applying the centrifugal force of the fluid of the bending portion thereto in the straight tube portion with a tube axis as a center.

14. The mass flow meter according to claim 8, wherein the strain gauge for compensation compensates static pressure or temperature of the fluid.

15. The mass flow meter according to claim 9, wherein the strain gauge for compensation compensates static pressure or temperature of the fluid.

* * * * *